United States Patent [19]

Fischer et al.

[11] Patent Number: 4,954,377
[45] Date of Patent: Sep. 4, 1990

[54] LOAD BEARING CONNECTIVE DAMPER

[75] Inventors: Eugene C. Fischer, Stevensville; Roger M. Crane, Arnold, both of Md.

[73] Assignee: The United States of America as represented by the Secretary of the Navy, Washington, D.C.

[21] Appl. No.: 274,587

[22] Filed: Nov. 22, 1988

[51] Int. Cl.$^5$ .................... B32B 25/02; B66C 1/18; F16D 3/56; F16F 1/36

[52] U.S. Cl. .................... 428/36.1; 156/307.7; 188/372; 248/557; 248/634; 248/635; 248/638; 267/141; 267/148; 267/153; 267/292; 294/74; 427/389.9; 428/36.8; 428/36.9; 428/113; 428/175; 428/192; 428/193; 428/222; 428/230; 428/246; 428/255; 428/257; 428/408; 428/902; 428/137; 464/88; 464/182

[58] Field of Search .............. 248/634, 635; 267/141, 267/148, 153, 292; 156/307.7; 294/74; 427/389.9; 464/88, 182; 428/109, 113, 230, 246, 255, 257, 175, 192, 193, 222, 408, 902, 137, 36.1, 36.8, 36.9

[56] References Cited

U.S. PATENT DOCUMENTS

| | | | |
|---|---|---|---|
| 3,426,804 | 2/1969 | Bluck . | |
| 3,603,350 | 9/1971 | Monroe | 267/153 |
| 3,866,073 | 2/1975 | Gjaja | 248/634 |
| 3,892,398 | 7/1975 | Marsh | 267/153 |
| 4,006,892 | 2/1977 | Koeneman | 267/141 |
| 4,312,261 | 1/1982 | Florentine . | |
| 4,573,842 | 3/1986 | Mantela et al. | 267/153 |
| 4,712,488 | 12/1987 | Herring | 267/153 |
| 4,779,850 | 10/1988 | Paton et al. | 267/292 |
| 4,789,023 | 12/1988 | Grant | 248/634 |
| 4,854,556 | 8/1989 | Pietryak | 267/148 |

OTHER PUBLICATIONS

Macander, Crane and Camponeschi, David Taylor Naval Ship Research and Development Center, Bethesda, MD 20084-5000, Report DTNSRDC/SME-8-4-66 of Oct. 1984.

Primary Examiner—James C. Cannon
Attorney, Agent, or Firm—Luther A. Marsh; John H. Stowe

[57] ABSTRACT

A load bearing connective damper for service in tensile, compression, and torsion as a shock and vibration isolation mounting device. Dampers are constructed using a multidimensionally braided textile shape and a viscoelastic material disposed in the interstrand spaces of the textile shape.

20 Claims, 3 Drawing Sheets

LOAD BEARING CONNECTIVE DAMPER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Field of the Invention

This invention relates to the field of support and transmission of physical loads and more particularly to supporting and transmitting such loads while rejecting shock and vibration components commonly associated with such loads.

Background Information

Mitigating the transmission of energy from an operating machine to a surrounding structure or between rotating components has been a subject of many different types of apparatus. Efficient mechanisms for mitigating shock and vibration frequently are not capable of carrying significant static or rotating loads. Conversely, mechanisms capable of carrying significant physical loads are frequently incapable of mitigating the unwanted shock and vibration components that may be associated with the transmission of such loads. In some systems, this type of apparatus may be limited by material limitations on the operating temperature or may not provide the required damping over a broad frequency range, especially in the loaded condition. Generally, each concept of design is related to a particular application of load support in tension, load support in compression or load support in torsion.

SUMMARY OF THE INVENTION

The present invention, a load bearing connective damper, comprises a multidimensionally braided textile shape having a highly viscoelastic material in the interstrand spaces. The ends of the connective damper may be terminated by suitable means for interfacing with a plurality of structures or rotating components. The strands are braided or woven in such a manner that an external force applied to the shape causes the strands to individually and collectively exert forces on the viscoelastic material. Further, when the load bearing connective damper is loaded at a high strain, the intersecting strands tend to move in a scissor fashion inducing shear in the viscoelastic material, the viscoelastic material absorbing the energy thereby transmitted. This scissor action occurs until the crimp point of the fibers is reached at which time further elongation occurs according to the elastic properties of the fibers themselves. Additionally, the interstrand spaces collectively form an interstrand volume which is chemically, mechanically or chemically and mechanically bonded to the strands.

It is an object of this invention to provide a load bearing connective damper having shock and vibration damping characteristics ad capable of carrying significant loads in compression, tension, and torsion.

Another object of this invention is to provide a load bearing connective damper having shock and vibration damping characteristics and structural strength characteristics determined relatively independently.

Other objects and advantages of the invention will be understood more fully from the following description when read in connection with the accompanying drawings.

DETAILED DESCRIPTION OF THE INVENTION

Figure 1:
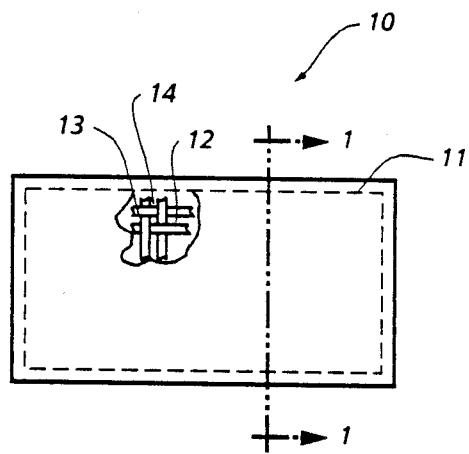
FIG. 1 is an elevation view, partially cut away of a first embodiment of the present invention.
Figure 2A:
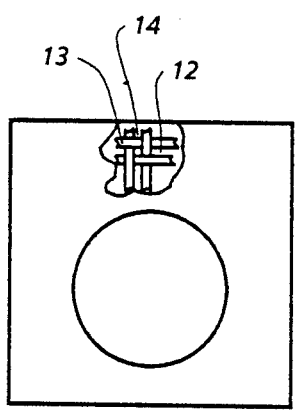
FIG. 2 is a sectional view taken along line 1—1 of FIG. 1, FIG. 2 being subdivided into FIG. 2a, 2b, and 2c to illustrate typical cross sections applicable to FIG. 1.
Figure 2B:
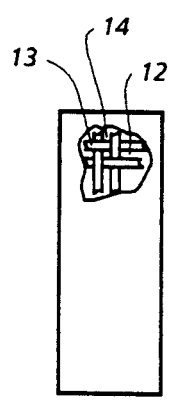
Figure 2C:
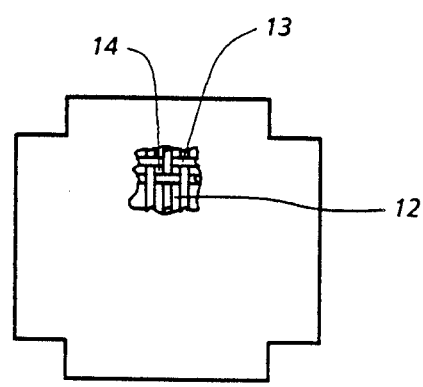

Referring now to FIG. 1, a load bearing connective damper in accordance with a first embodiment of the present invention is illustrated generally as 10. Load bearing connective damper 10 comprises a multidimensionally braided textile shape 11 having strands 13 and interstrand spaces 14, interstrand spaces 14 substantially filled with a highly viscoelastic material 12. Where suitable, the highly viscoelastic material 12 may extend beyond the extremes of the form of textile shape 14. A load bearing connective damper may be made in accordance with this invention with a variety of cross sections of which FIG. 2a, 2b, and 2c are exemplary. References to a first preferred embodiment are to a damper which can be used individually in appropriate circumstances or as a damper element in other appropriate circumstances.

Multidimensionally braided textile shape 11 is fabricated by a process such as multidimensional braiding or weaving. multidimensional braiding or weaving is a term well known in the trade of producing rigid composites. An extensive discussion of the use of multidimensionally braided materials for producing a skeletal structure for rigid composite structures is presented in Macander, et al., The Fabrication, Processing and Characterization of Multidimensionally Braided Graphite/Epoxy Composite Materials, David Taylor Research Center Report DTNSRDC/SME-84-66 of Oct. 1984, the text of which is hereby incorporated by reference. Machinery for producing a multidimensionally braided preform is disclosed generally in U.S. Pat. Nos. 3,426,804 to Bluck and 4,312,261, to Florentine. Heretofore, multidimensional braiding has been recognized for its effectiveness in producing replacements for rigid laminated structures.

Various forms of textile material may be used to fabricate textile shape 11. The term strand will be used in the description and in the appended claims to describe one of the discrete elements which are braided or woven to comprise the textile shape, it being understood that the term strand as used herein is synonymous in usage with other suitable forms of textile material such as for example, filaments, thread, cord, yarn, bundles, and fiber tows. It is readily apparent that a shape formed by the multidimensionally braiding process comprises a network of intersecting strands 13. Due to the geometry of the braid or weave, it is inevitable that not all the volume of the shape will be filled with the material of strands 13. Disposed between adjacent strands 13 is a complex space not filled by strands 13. For the purpose of the description of this invention and in the appended claims, this network of spaces will be referred to as the interstrand spaces or interstrand volume.

Interstrand spaces 14 of textile shape 11 of load bearing connective damper 10 of the present invention are substantially filled and strands 13 are preferably bonded together with a highly viscoelastic material such as for example, butyl or nitrile rubber or any other highly viscoelastic material that exhibits molecular interaction when subjected to shearing forces. Preferably, this viscoelastic material not only fills the interstrand spaces, but also totally encapsulates all strands and fibers which make up the strands forming an intimate chemical, mechanical, or chemical and mechanical bond with the strand in an interconnective network. This bonded network of interstrand spaces is referred to as the interstrand volume. The general characteristics of the viscoelastic material in the cured condition are such as exhibit a capacity to withstand a high strain to failure and a high damping loss factor.

A load bearing connective damper of the present invention is made by preparing a multidimensionally braided textile shape, impregnating the textile shape with an uncured highly viscoelastic material, and them curing the viscoelastic material. Alternately, a load bearing connective damper of the present invention may be fabricated by coating a plurality of strands of a textile material with an uncured highly viscoelastic material, then forming a multidimensionally textile shape using the coated strands, and finally curing the viscoelastic material. In the alternate process, the interstrand spaces also include space between adjacent strands preserved by the material initially surrounding the individual strands. In this event, the strands are substantially surrounded by the viscoelastic material. The interstrand spaces are partially filled by material which is extruded from the coated strands during the braiding process and may be further filled by impregnation if desirable.

Heat, pressure or vacuum as appropriate are used to encourage bonding of adjacent strands throughout a substantial portion of the volume of the braided textile shape. When necessary, auxiliary shape holding equipment such as forms or molds may be used to retain a particular shape of the load bearing damper during the curing process. Forms and molds are particularly useful when it is desirable for the viscoelastic material to extend beyond the limits of the multidimensionally braided form. In some forms, the need for auxiliary holding equipment may depend on the denisty of the weave. Generally, the multidimensionally braiding process produces shapes which hold their own form during subsequent processing, however, load bearing connective dampers are made in accordance with the present invention where the density of the braid is such that auxiliary form definition apparatus may be required during the curing process. It is not necessary that the textile shape always be embedded in the viscoelastic material as the structural strength is determined primarily by the textile shape and secondarily by the viscoelastic material. Thus, nicks and irregularities along the periphery of the damper will not cause the initiation of failure as will nicks and irregularities on the periphery of a conventional device.

When the connective damper is subjected to a force that tends to change the relative space relationship of the individual strands, the strands individually and the multidimensionally braided shape collective induce shear into the viscoelastic material in the interstrand spaces, causing the viscoelastic material disposed in the interstrand sapces to dissipate large amounts of energy. Because the resistance provided by the viscoelastic material, the stretching motion of the multidimensionally braided shape demands increasing energy levels to continue to deform or stretch, thereby achieving shock absorbing and mechanical vibration damping. The stretching motion will continue until the strands reach their specific strand crimp angle. Specific strand crimp angle refers to the minimum angle between strand intersections that can be achieved. After the specific strand crimp angle is reached, the rate of stretching will decrease significantly because it is then the strands that are being stretched. The placement of the textile shape and the relative dimensions of the textile shape are design considerations with a multiplicity of solutions for particular situations.

The invention can be further described by reference to specific embodiments that are presented by way of illustration of uses of the basic invention and not by way of limitation.

Figure 3:
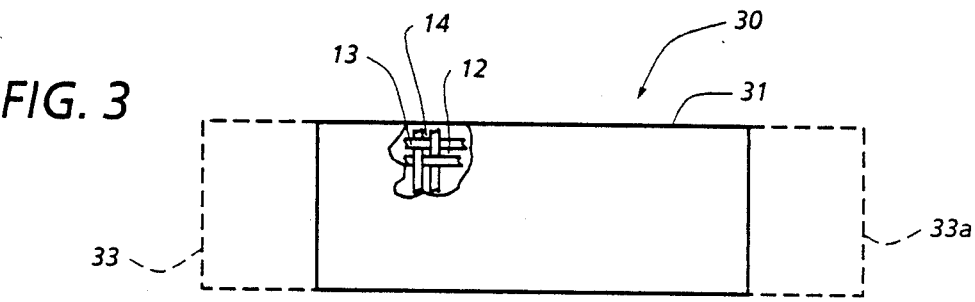
FIG. 3 illustrates an embodiment of the present invention showing the invention adapted as a strap for hanging loads from an overhead structure.

Referring now to FIG. 3, a second embodiment of the present invention is illustrated. A load bearing connective damper adapted for use as a hanger strap for supporting machinery, pipes, conduits, or the like that must be connected to or mounted in an overhead or surrounding structure is illustrated generally as 30. Load bearing connective damper 30 comprises multidimensionally braided textile shape 31 having interstrand spaces 14 substantially filled with viscoelastic material 12. Mounting flanges 33 and 33a are attached by suitable means such as clamping or adhesive bonding. Alternately, strands 13 of multidimensionally braided shaped 31 are affixedly attached to mounting flanges 33 and 33a and the combination of braided textile shaped 31 and at least a portion of mounting flanges 33 and 33a are subject to filling or impregnation process such that interstrand spaces are filled with and at least a portion of the mounting flanges are covered by the viscoelastic material. Another form of termination is to extend the ends of the textile shape and braid a loop, then insert metallic retainers in the loop to uniformly transfer the load from the connective damper to the mounting bolts for the device to be suspended.

Figure 4:
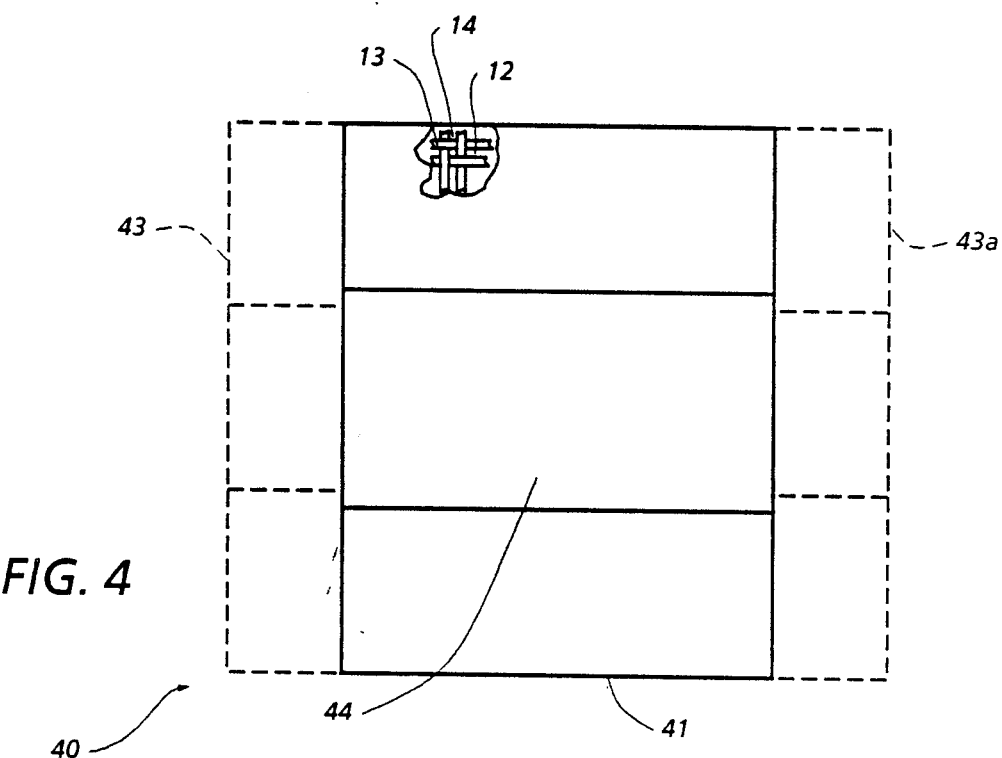
FIG. 4 is an embodiment of the present invention showing the invention adapted for use as a coupling between adjacent rotating shafts.

A third embodiment of the present invention, a load bearing connective damper, adapted for use in torsional or rotational service is illustrated generally as 40 in FIG. 4. Using the invention for torsional transmission of loads may differ in the geometry of the parts but not in the manner in which the invention operates. Typically, a connective damper adapted for torsional loads will be shorter and larger in diameter than a connective damper adapted for use as a hanger strap. In the torsional transmission case, torsional loads are resisted by the viscoelastic material initiating the shearing action that results in damping. The braided configuration is of course tailored to support torsional loads. As one end of the connective damper is loaded, it is damped due to the viscoelastic nature of the system. An initial impact from rapid loading that occurs such as when a motor is started is slowly transmitted to the opposite end, thereby reducing mechanical shock. It is not necessary that the multidimensionally braided textile shape 41 be in a cylindrical configuration. In addition to providing a torsional shock absorbance, the transmission of mechanical vibrations is also prevented.

In the third embodiment, a connective damper 40 shown in FIG. 4 comprises a multidimensionally braided textile shape 41 having strands 13 intersecting to form interstrand spaces 14, interstrand spaces 14 being substantially filled with viscoelastic material 12. Additionally, the interstrand spaces collectively form a interstrand volume which is chemically, mechanically or chemically and mechanically bonded to the strands. Preferably, the interconnective network of the interstrand volume also totally encompasses the strands.

Mounting flanges 43 and 43a are adapted for attachment to rotatable members, not shown. Multidimensionally braided textile shape 41 having interstrand spaces substantially filled with a viscoelastic material is attached to mounting flanges 43 and 43a by suitable means such as clamping or adhesive bonding. Alternately, strands 13 of multidimensionally braided shape 41 are affixedly attached to mounting flanges 43 and 43a and the combination of connective textile shape 41 and at least a portion mounting of flanges 43 and 43a are subjected to filling or impregnation process such that interstrand spaces 14 are filled with and at least a portion of the mounting flanges are covered by the viscoelastic material. One form of termination is to extend selected strand ends of the textile shape and fabricate the ends into loops, then inserting metallic retainers. Another form of termination is to use a non-circular multidimensionally braided textile shape and close fitting conforming envelopes surrounding a portion of the multidimensionally braided textile shape to transmit the torsional loads.

Alternately, the interior of connective damper 40 may have a cavity 44 which will act as a clearance for the ends of the mating torsional members and also reduce the necessary working cross section of multidimensionally braided textile shape 41 without significant reduction in torque transmitting ability.

Figure 5:
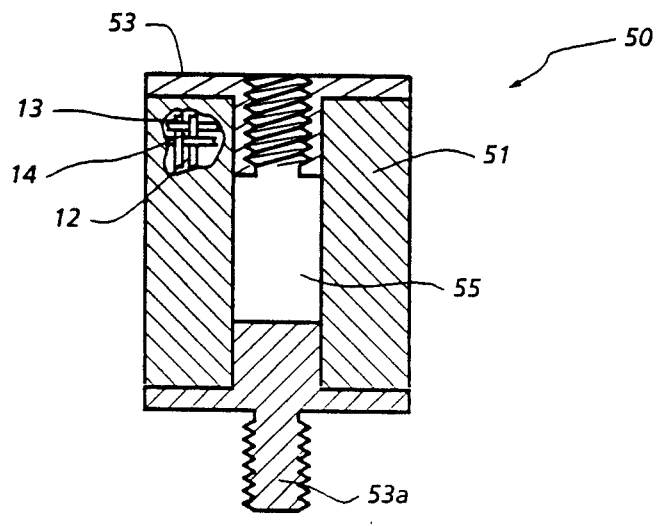
FIG. 5 is an embodiment of the present invention showing the invention adapted as a machinery mount for supporting and isolating a vibrating machine.

A fourth embodiment of the present invention, adapted for use as a connective damper for vertical support of loads from underneath is illustrated generally as 50 in FIG. 5. Using the invention for upwardly support of loads may differ in the geometry of the parts from the first and second embodiment but not in the manner in which the invention operates. A connective damper adapted for upwardly supporting loads will typically be shorter and larger cross sectional area than a connective damper adapted for use as a hanger strap. In the case of upwardly supporting loads, compression forces including any vibratory or shock loads associated therewith are resisted by the viscoelastic material initiating the shearing action that results in damping. The configuration of the multidimensionally braided textile shape is of course tailored to support compression loads. As one end of the connective damper is loaded, it is damped due to the elastic nature of the system. Initial impacts resulting from rapid loading that occurs such as when a motor is started reflecting reaction torques into a frame are slowly transmitted to the opposite end, thereby reducing mechanical shock. Additonally, this configuration can also carry large tensile forces which also occur during shock so as to shook harden the attached machinery or equipment.

In the fourth embodiment, a connective damper 50 shown in FIG. 5 comprises a multidimensionally braided textile shape 51 having interstrand spaces 14 substantially filled with viscoelastic material 12. Mounting flanges 53 and 53a are adapted for attachment to the supporting structure and the apparatus to be supported, not shown. Multidimensionally braided textile shape 51 having interstrand spaces 14 substantially filled with substantially viscoelastic material 12 is attached to mounting flanges 53 and 53a by suitable means such as clamping or adhesive bonding. Alternately, strands 13 of multidimensionally braided shape 51 are affixedly attached to mounting flanges 53 and 53a and the combination of connective textile shape 51 and at least a portion mounting of flanges 53 and 53a are subjected to filling or impregnation process such that interstrand spaces 14 are filled with and at least a portion of the mounting flanges are covered by the viscoelastic material. One form of termination is to extend selected strand ends of the textile shape and fabricate the ends into loops, then inserting metallic retainers. Another form of termination is to use close fitting conforming envelopes surrounding a portion of the multidimensionally braided textile shape to transmit the loads.

Alternately, the interior of connective damper 50 may have a cavity 55 which will act as a clearance for mounting bolts for appropriately mounting the connective damper of the apparatus to be mounted.

Many obvious modification in the details and arrangement of parts may be made, however, without departing from the true spirit and scope of the invention, as more particularly defined in the appended claims.

What is claimed is:

1. A load bearing connective damper, comprising:
a multidimensionally braided textile shape having a multiplicity of strands forming a multiplicity of interstrand spaces; and
a viscoelastic material disposed in a contiguous relationship with said strands and said interstrand spaces.

2. A load bearing connective damper as claimed in claim 1 wherein said interstrand spaces are substantially filled with said viscoelastic material.

3. A load bearing connective damper as claimed in claim 2 wherein said interstrand spaces collectively form an interstrand volume bonded to said strands.

4. A load bearing connective damper as claimed in claim 3 wherein said interstrand volume is chemically bonded to said strands.

5. A load bearing connective damper as claimed in claim 3 wherein said interstrand volume is mechanically bonded to said strands.

6. A load bearing connective damper as claimed in claim 1 further comprising an outer coating of said viscoelastic material.

7. A load bearing connective damper as claimed in claim 1 wherein said braided textile shape has at least one internal cavity.

8. A load bearing connective damper as claimed in claim 1 further comprising an exterior form of said viscoelastic material.

9. A load bearing connective damper as claimed in claim 1 wherein a multiplicity of said strands have a surrounding layer of viscoelastic material.

10. A load bearing connective damper, comprising:
a multidimensionally braided textile shaped having a multiplicity of strands forming a multiplicity of interstrand spaces; and a viscoelastic material disposed in a contiguous relationship with said strands and said interstrand spaces; and, at least one mounting flange affixedly attached to said shape.

11. A load bearing connective damper as claimed in claim 10 wherein said at least one mounting flange is affixedly attached by clamping.

12. A load bearing connective damper as claimed in claim 10 wherein said at least one mounting flange is affixedly attached by adhesive bonding.

13. A load bearing connective damper as claimed in claim 10 wherein said at least one mounting flange is affixedly attached to loops formed in said braided textile shaped.

14. A load bearing connective damper as claimed in claim 13 wherein said loops are multidimensionally braided.

15. A load bearing connective damper as claimed in claim 10 wherein said viscoelastic material further covers at least a portion of said mounting flange.

16. A load bearing connective damper as claimed in claim 10 wherein said at least one mounting flange slidingly receives said multidimensionally textile shape along a non circular surface of said textile shape.

17. A load bearing damper as claimed in claim 16 further comprising an outer coating of said viscoelastic material.

18. A load bearing connective damper as claimed in claim 16 further comprising an outer shell of said viscoelastic material.

19. A process for making a load bearing connective damper, comprising:
   preparing a multidimensionally braided textile shape;
   impregnating said shape with an uncured highly viscoelastic material; and,
   curing said viscoelastic material.

20. A process for making a load bearing connective damper, comprising:
   coating a plurality of strands with an uncured highly viscoelastic material;
   forming a multidimensionally braided textile shaped using said coated strands; and,
   curing said viscoelastic material.

* * * * *